United States Patent [19]

Newman

[11] 4,415,387
[45] Nov. 15, 1983

[54] METHOD OF FORMING AN ANNULAR SEAM BETWEEN TWO CONTAINER BODY HALVES

[75] Inventor: Fred C. Newman, La Grange Park, Ill.

[73] Assignee: The Continental Group, Inc., Stamford, Conn.

[21] Appl. No.: 421,189

[22] Filed: Sep. 22, 1982

Related U.S. Application Data

[62] Division of Ser. No. 215,602, Dec. 12, 1980, Pat. No. 4,372,459.

[51] Int. Cl.³ .................. B23P 11/02; B29C 27/00
[52] U.S. Cl. .................................. 156/69; 29/451; 29/458; 29/469.5; 156/198; 156/227; 156/294; 156/295; 220/76; 220/81 R; 403/268; 403/282
[58] Field of Search ............. 156/69, 198, 227, 294, 156/295; 220/76, 81 R; 403/282, 265, 268; 29/451, 458, 469.5

[56] References Cited

U.S. PATENT DOCUMENTS

| | | | |
|---|---|---|---|
| 2,218,116 | 10/1940 | Magill | 156/69 |
| 3,160,542 | 12/1964 | Foye | 156/295 |
| 3,208,136 | 9/1965 | Joslin | 29/458 |
| 3,220,594 | 11/1965 | Ortheil et al. | 220/81 R |
| 3,685,682 | 8/1972 | Frey | 156/69 |
| 3,689,114 | 9/1972 | Meserole | 403/268 |
| 4,006,838 | 2/1977 | Baumann | 220/81 R |
| 4,014,723 | 3/1977 | Jones | 156/69 |
| 4,120,083 | 10/1978 | Echols | 29/458 |
| 4,304,038 | 12/1981 | Yabu et al. | 156/295 |
| 4,373,983 | 2/1983 | Walter | 156/294 |

*Primary Examiner*—Jerome W. Massie
*Attorney, Agent, or Firm*—Charles E. Brown

[57] ABSTRACT

This relates to an annular seam between two tubular body portions. The seam is particularly adapted for joining open ends of two cup members to form a container. The seam incorporates a hem on one of the members with the hem facilitating the application of the adhesive required to bond the cup members together while at the same time permitting the same adhesive to engage raw edges of the cup members in sealing relation.

2 Claims, 3 Drawing Figures

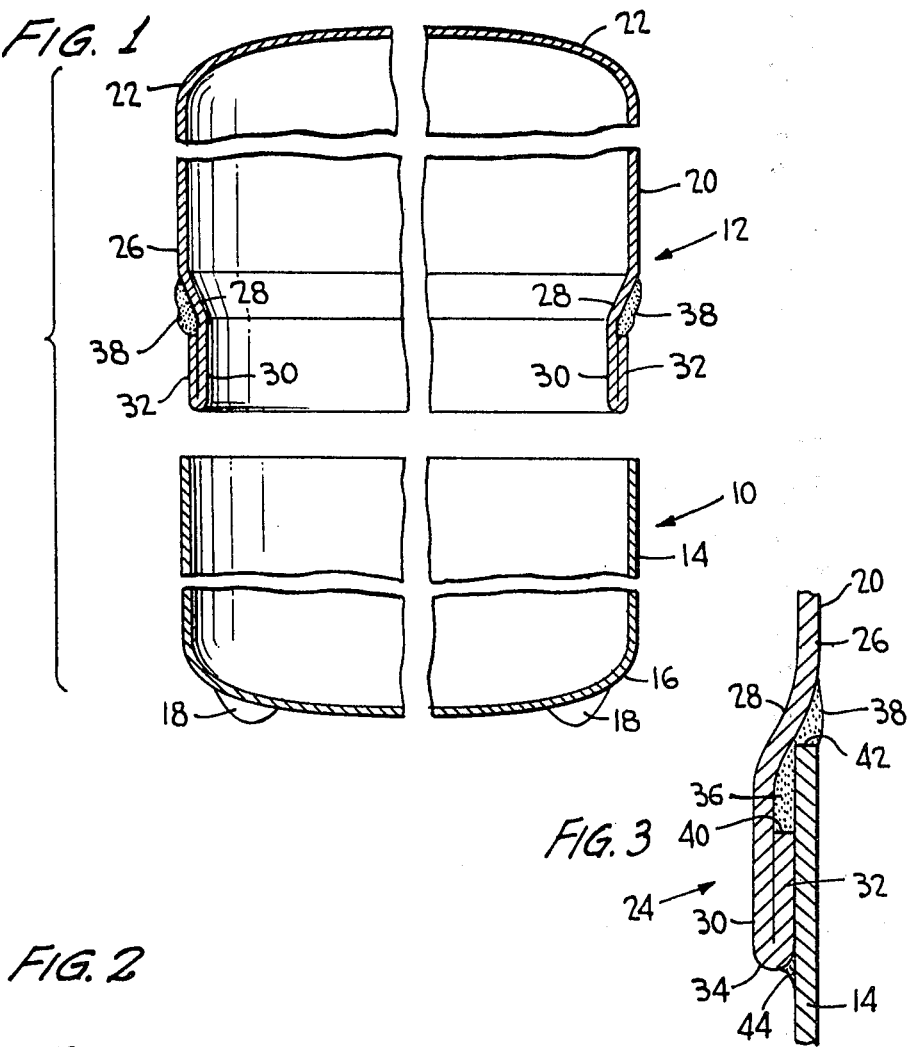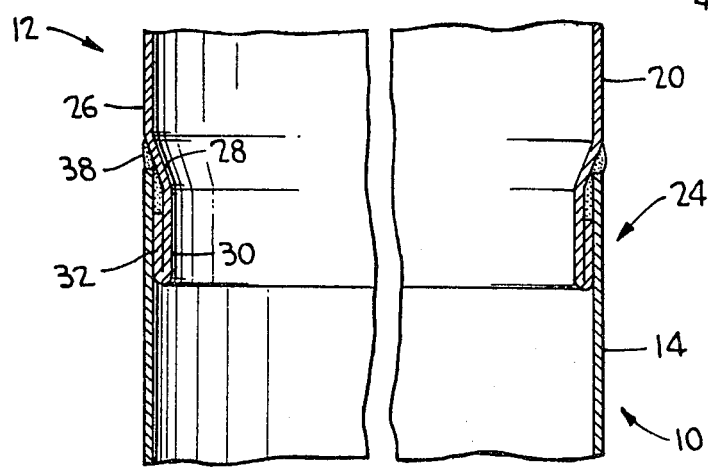

METHOD OF FORMING AN ANNULAR SEAM BETWEEN TWO CONTAINER BODY HALVES

This is a division of Ser. No. 215,602, filed Dec. 12, 1980, now U.S. Pat. No. 4,372,459.

This invention relates in general to new and useful improvements in a seam or connection between two container body halves wherein each half includes a generally closed end portion and an open end portion and wherein the open end portions of the two container halves are joined together.

It has been proposed to form cans and like containers in the form of a pair of joined together cups. The cups may be formed from sheet material by simple drawing operations which may include wall ironing. The net result is that each cup has a cylindrical body portion terminating in an open end, and it is necessary to join these open ends by an annular seam which will not only withstand any internal pressure which may exist within the filled can and distortion pressures resulting from dropping or like shock, but also may be of a construction wherein the raw ends or edges of the open ends of the cup-shaped bodies may be sealed against both the packaged product and external elements.

It has been proposed merely to offset one end portion of one of the cup-shaped body members and then to telescope the end portions with there being a thin layer of adhesive between the telescoped end portions bonding the container halves together in sealed relation. This construction, of course, provides a free or raw edge of one container cup internally of the container and a like raw edge externally of the cup of the container which must be suitably sealed by a suitable coating material.

In acccordance with this invention it is proposed to provide an annular seam between two open ended container bodies wherein the adhesive which serves to bond together the container body portions also serves to seal the raw edges of the container body portions.

Most specifically, it is proposed to radially offset an end portion of one container cup a distance twice the wall thickness of the container cup and then to provide a reversely folded hem which is on that side of the radially displaced part opposite to the direction of displacement wherein the hem may receive in telescoped sliding relation a cylindrical end portion of the other cup member. The net result is that the free edge of the open end portion of each of the cup-shaped members is on the same side of the container body and faces in the same axial direction. In this manner a single annular application of adhesive may be used for the multiple purpose of bonding together the cup-shaped members and to cover the free ends or edges of both cup-shaped members in sealed relation.

It is preferred that the radial displacement of the end portion of a cup member be inwardly directed and that the hem be outwardly folded so that the adhesive is generally open to the exterior of the container or can body. The interfit between the hem and the cylindrical open end portion of the other cup member thus generally excludes the contents of the container from the seam. Further, a bight part which joins the hem to an adjacent part of the offset container half free end portion forms, in conjunction with the inner surface of the other cup member, a cavity which is ready to receive an annular ring of coating material to assure a complete sealing of the seam.

It is to be understood, that the cup members will normally be formed of a coated metal and it is wholly undesirable to effect a cracking or other rupture of the coating material in the forming of the offset part and hem. However, by first effecting the offsetting of the end part radially inwardly, the hem may be formed by radially outwardly folding the terminal part of the offset part without danger of cracking the coating.

With the above and other objects in view that will hereinafter appear, the nature of the invention will be more clearly understood by reference to the following detailed description, the appended claims, and the several views illustrated in the accompanying drawings.

IN THE DRAWINGS

FIG. 1 is a vertical sectional view taken through two cup-shaped members defining two halves of a container, portions of the cup-shaped members being broken away and the cup-shaped members being in alignment ready for telescoping engagement.

FIG. 2 is a sectional view through the seam portion of the container with parts of the container halves broken away, and shows the cup shaped members being joined together by an annular seam formed in accordance with the invention.

FIG. 3 is an enlarged fragmentary sectional view taken through the seam, and shows the specific details thereof.

Referring now to the drawings in detail, it will be seen that there is illustrated in FIG. 1 the components of a container or can. In accordance with the preferred embodiment of the invention, the can is formed of two cup-shaped members 10 and 12 which may be formed from sheet material by a conventional drawing or drawing and wall ironing method. The mode of making the cup-shaped members 10 and 12 in no way forms a part of this invention.

The cup member 10 includes a generally cylindrical body portion 14 which is closed at its lower end by an integral end 16 which forms the bottom of the resultant container and which may be of a shape to include projecting buttons or feet 18 to provide for a stabilized base. The cup member 12 also includes a cylindrical body 20 which terminates at its upper end in an intergral end 22. The end 22 normally will be provided with a combined filling and dispensing opening which will be equipped with a suitable closure, all not shown in that they in no way form a part of the invention.

The cup members 10 and 12, when formed of metal, will be preferably formed of either aluminum or steel and will be provided with a very thin plastic material protective coating on both the inner and outer surfaces thereof. Because of the thinness of this coating, it will not be illustrated here.

In accordance with this invention, an annular seam, generally identified by the numeral 24, is formed between the cup members 10 and 12 sealing together the open ends thereof. In order to form the annular seam 24, no modification of the cylindrical body 14 of the cup member 10 is required. On the other hand, as is best shown in FIG. 3, the open end portion of the cup member 12 is modified so as to be telescopable relative to the open end of the body 14. The body 20 is of the same size as the body 14 and, therefore, the open end of the cup member 12 will include a generally cylindrical part 26 which is axially displaced from the extreme free end of the body 20. Adjacent the cylindrical part 26 is a generally frustoconical transition part 28 which terminates in a generally cylindrical sleeve part 30. The sleeve part 30 is radially displaced from the cylindrical part 26 a distance on the order of twice the wall thickness of the bodies 14 and 20.

The extreme end part of the body 20 is reversely folded to define a hem 32 which is joined to the sleeve part 30 by a bight 34. It is to be noted that the hem 32 is on the side of the sleeve part 30 opposite to the direction of offsetting of the sleeve part 30.

It will be seen that the relative dimensions of the hem 32 and the bodies 14 and 20 are such that the hem 32 may be telescoped relative to the body 14 in sliding engagement, while the body 14 is axially and radially aligned with the body 20.

The cylindrical part 26, the transition part 28, the sleeve part 30 and the hem 32 all combine to define an annular socket or recess 36. An annular band of a suitable adhesive 38 is placed in this socket with the adhesive band slightly overflowing, as is best shown in FIG. 1.

It will be readily apparent from FIG. 3 that the hem 32 terminates in a free or raw edge 40 which faces in the same direction and is on the same radial side of the container as a free or raw edge 42 of the body 14. Further, the adhesive 38, when initially applied, engages the raw edge 40 of the hem in sealing relation. Then, when the bodies 14 and 20 are telescoped relative to one another, the raw edge 42 engages the adhesive 38 and serves to strike off a portion thereof and displace the struck off portion to assure that the adhesive 39 will engage the raw edge 42 in sealed relation.

It is to be understood that the adhesive 38 will bond together the cup members 10 and 12 to the extent required to withstand internal pressures even when the container or can is packaged under pressurized conditions, and the product may include carbonated beverages wherein high internal pressures are required. At the same time, the raw edges 40 and 42 are completely sealed with respect to the product and external atmosphere.

If desired, a further, but much smaller, annular band adhesive 44 may be placed between the bight 34 and the body 14 within the annular cavity defined therebetween. While the material has been indicated here as being an adhesive, it is to be understood that the adhesive 44 could be merely a suitable conventional coating material.

It is to be understood that the sleeve part 30 is preferably radially offset into the interior of the container. This makes the raw edges 40 and 42 located exteriorly of the container so as to minimize the sealing requirements. Further, the hem 32 may be more readily folded without cracking of the coating on the cup members 10 and 12. On the other hand, it is within the scope of this invention to reverse the radial positions of the two cup members so that the hem 32 is exterior of the can, although from a commercially feasible standpoint this is not the equivalent of the illustrated embodiment of the invention.

Although only a preferred embodiment of the invention has been specifically illustrated and described herein, it is to be understood that minor variations may be made in the constructional details of the seam without departing from the spirit and scope of the invention as defined by the appended claims.

I claim:

1. A method of joining open ends of cup members to form a container, said method comprising the steps of radially displacing in a selected direction a terminal portion of an open end of one of said cup members and reversely folding a terminal part of said terminal portion in an opposite radial direction to define a hem of a radial dimension to receive in sliding telescoped engagement an open end portion of the other of said cup members and wherein an annular chamber is provided at a free end of said hem, filling said annular chamber generally to overflowing with an adhesive, telescoping open ends of said cup members with a free end of said other cup member engaging said adhesive and displacing a portion of said adhesive in a shearing action to trap part of said adhesive between said cup members axially adjacent said hem free end and in sealing engagement with said hem free end and to cover in sealing engagement the free end of said other cup member.

2. The method of claim 1 wherein said radial displacing of said terminal portion is radially inward whereby said annular chamber opens radially outwardly and said adhesive is disposed externally of the container.

* * * * *